United States Patent [19]
Horikoshi

[11] Patent Number: 5,609,087
[45] Date of Patent: Mar. 11, 1997

[54] VALVE MECHANISM FOR BOOSTER

[75] Inventor: Satoru Horikoshi, Saitama-ken, Japan

[73] Assignee: Jidosha Kiki Co., Ltd., Tokyo, Japan

[21] Appl. No.: 613,210

[22] Filed: Mar. 8, 1996

[30] Foreign Application Priority Data

Mar. 31, 1995 [JP] Japan .................................. 7-099938

[51] Int. Cl.⁶ ...................................................... F15B 9/10
[52] U.S. Cl. ...................................................... 91/376 R
[58] Field of Search ............................................ 91/376 R

[56] References Cited

U.S. PATENT DOCUMENTS

| | | | |
|---|---|---|---|
| 3,548,718 | 12/1970 | Utton ..................................... | 91/376 R |
| 4,005,638 | 2/1977 | Takeuchi ............................... | 91/376 R |
| 5,027,695 | 7/1991 | Inoue et al. . | |
| 5,046,398 | 9/1991 | Hamamiya et al. . | |
| 5,263,399 | 11/1993 | Flory et al. ........................... | 91/376 R |
| 5,355,771 | 10/1994 | Watanabe . | |
| 5,373,776 | 12/1994 | Uyama . | |

*Primary Examiner*—F. Daniel Lopez
*Attorney, Agent, or Firm*—Flynn, Thiel, Boutell & Tanis, P.C.

[57] ABSTRACT

An improvement of a valve mechanism for brake booster is disclosed. According to the invention, a valve mechanism for booster comprises a first valve seat formed on a valve body, a first valve element adapted to be seated upon the first valve seat, a second valve seat formed on a rear side of a valve plunger, and a second valve element adapted to be seated upon the second valve seat. The first valve element is urged rearwardly by a first spring, whereby a rear end of the first valve element is maintained in abutment against the second valve element while maintaining a hermetic seal therebetween. The second valve element is urged toward the second valve seat by a second spring having a resilience greater than that of the first spring. The diameter of a first seat area S1 where a contact occurs between the first valve seat and the first valve element is substantially equal to the diameter of a second seat area S2 where a contact occurs between the second valve seat and the second valve element. This construction allows an increased responsive area to be secured to the negative pressure in a region radially outward of the first seat area S1, thus allowing the load with which the second spring must be compressed to be reduced by an amount corresponding to an increase in the resulting pressure differential, thus in turn allowing an input required to initiate the operation of the booster to be reduced.

3 Claims, 1 Drawing Sheet

VALVE MECHANISM FOR BOOSTER

FIELD OF THE INVENTION

The invention relates to a booster as may be used in a brake of an automobile or the like, and more particularly, to an improvement of a valve mechanism for booster.

DESCRIPTION OF THE PRIOR ART

In a conventional arrangement, a brake booster of negative pressure type comprises a valve body slidably disposed within a shell, a power piston mounted on the valve body, a constant pressure chamber and a variable pressure chamber formed across the power piston, a valve mechanism including a valve plunger slidably fitted into the valve body, a constant pressure passage communicating the valve mechanism with the constant pressure chamber, a variable pressure passage communicating the valve mechanism with the variable pressure chamber, and a pressure passage for supplying to the valve mechanism the atmosphere acting as a pressure fluid. The valve plunger which constitutes the valve mechanism is operated to switch a flow path within the valve mechanism, supplying the pressure fluid to the variable pressure chamber to drive the power piston forward.

The valve mechanism mentioned above normally comprises an annular, first valve seat formed on the valve body, an annular, second valve seat located radially inward of the first valve seat and formed on a rear portion of the valve plunger, a tubular valve element having its rear end hermetically secured to the inner peripheral surface of the valve body and a front end which is adapted to be seated upon either the first or the second valve seat, and a spring for urging the front end of the valve element toward the first and the second valve seat. The constant pressure passage communicates with a space located radially outward of the first valve seat, the variable pressure passage communicates with a space located intermediate the first and the second valve seat, and the pressure passage communicates with a space located radially inward of the second valve seat.

In a conventional brake booster of negative pressure type constructed in the manner mentioned above, when the booster is inoperative without depression of a brake pedal, the valve element is seated upon the second valve seat to block the introduction of the atmosphere, acting as a pressure fluid, into the variable pressure chamber while the valve element is removed from the first valve seat to allow a communication between the variable and the constant pressure chamber, thus introducing a negative pressure into the both chambers.

By contrast, when the booster is operated in response to the depression of a brake pedal, the valve element is seated upon the first valve seat to interrupt the communication between the constant and the variable pressure chamber, and the valve element is removed from the second valve seat to introduce the atmosphere into the variable pressure chamber, enabling a booster action by the booster.

In a conventional booster as mentioned, the annular, first valve seat is located radially outward while the annular, second valve seat is located radially inward in concentric manner, so that when the booster is operated in which the valve element is seated upon the first valve seat, the effect of a pressure differential acting upon the valve element to urge it will be reduced as compared when the booster is inoperative in which the valve element is seated upon the second valve seat.

More specifically, when the brake booster is inoperative, the variable pressure passage communicates with the constant pressure passage, and accordingly, the negative pressure obviously acts upon the front end face of the valve element which faces a space located radially outward of the first valve seat which communicates with the constant pressure passage, and the negative pressure also acts upon the front end face of the valve element which faces a space intermediate the first and the second valve seat which communicates with the variable pressure passage. On the other hand, the atmospheric pressure acts upon the rear end face of the valve element through the pressure passage, and accordingly, the valve element is urged forwardly with a relatively strong bias under the influence of the pressure differential between the negative pressure on one hand and the atmospheric pressure on the other hand.

By contrast, however, when the brake booster is operated, the valve element will be urged forwardly with a lesser effect since the atmosphere is introduced into the variable pressure passage while the front end face of the valve element which is subject to the influence of the negative pressure is only that portion of the front end face which faces a space located radially outward of the first valve seat which communicates with the constant pressure passage.

When the brake booster is operative, the valve element is seated upon the first valve seat, but when the urging effect is reduced, there is a likelihood of producing a failure of the hermetic seal in the associated region, or a leakage, and accordingly it has been the prior art practice that a spring which urges the front end of the valve element toward the first and the second valve seat must be compressed with a greater load. However, when the load with which the spring is compressed is increased, there results a disadvantage that an input required to initiate the operation of switching the flow path within the valve mechanism must be increased.

To overcome such disadvantage, it is contemplated that a portion of the valve seat located radially outward of a seat thereof which will be seated upon the first valve seat be enlarged radially outward to increase an area which is subject to the negative pressure. However, as a result of enlarging the diameter of the valve element, the diameter of the valve body must also be increased, resulting in an increased size of the booster.

SUMMARY OF THE INVENTION

In view of the foregoing, the invention provides a valve mechanism for booster which allows an area subject to the action of the negative pressure to be increased without increasing the diameter of the valve body, thereby allowing the load with which the spring must be compressed to be reduced, which in turn allows an input required to initiate the operation when switching a flow path within the valve mechanism to be reduced.

Specifically, in a booster including a valve body slidably disposed within a shell, a power piston mounted on the valve body, a constant pressure chamber and a variable pressure chamber formed across the power piston, a valve mechanism including a valve plunger slidably fitted into the valve body, a constant pressure passage communicating the valve mechanism with the constant pressure chamber, a variable pressure passage communicating the valve mechanism with the variable pressure chamber, and a pressure passage supplying a pressure fluid to the valve mechanism, with the valve plunger, which constitutes the valve mechanism, being actuated to switch a flow path within the valve mechanism to supply the pressure fluid to the variable pressure chamber to drive the power piston forward, in accordance with the invention, the valve mechanism comprises an annular, first valve seat formed on the valve body, a tubular first valve element slidably fitted into the valve body and having a front end which is adapted to be seated upon the first valve seat, an annular, second valve seat formed on the rear side of the valve plunger, a tubular second valve element having a rear end which is hermetically secured to the inner peripheral surface of the valve body and a front end which is adapted to be seated upon the second valve seat, a first spring for urging the first valve element rearward and for maintaining the rear end of the first valve element in abutment against the second valve element hermetically at a location radially outward of a seating engagement between the second valve element and the second valve seat, and a second spring for urging the front end of the second valve element toward the second valve seat and having a resilience greater than the resilience of the first spring, and wherein the constant pressure passage communicates with a space radially outward of the first valve element, the variable pressure passage communicates with the space located radially inward of the first valve element, and the pressure passage communicates with a space radially inward of the second valve element.

In addition, a seat defined by the engagement between the first valve element and the first valve seat, and a seat defined by the engagement between the second valve element and the second valve seat may be chosen to be of a substantially equal diameter.

With this construction, the front end of the second valve element becomes seated upon the second valve seat, and the rear end of the first valve element is maintained in abutment against the second valve element while maintaining a hermetic seal therebetween at a location radially outward of a seat defined by the engagement between the second valve element and the second valve seat while the front end of the first valve element becomes seated upon the first valve seat. Accordingly, the first and the second valve seat may be axially separated from each other. Consequently, the diameters of the first and the second valve seat, both annular, can be reduced. In particular, the diameter of the first valve seat which has heretofore been necessary to be formed outside the second valve seat can be reduced.

Accordingly, by reducing the diameter of the first valve seat, a pressure-responsive area of the first valve element which is subject to the negative pressure can be increased without increasing the diameter of the valve body, allowing the pressure differential acting upon the first valve element upon operation of the booster to be increased. As a consequence, the load with which the second spring must be compressed can be reduced, thus allowing an input required to initiate the operation when switching the valve mechanism can be reduced without increasing the size of the booster.

While it is necessary to operate the first and the second valve element integrally while maintaining a hermetic seal therebetween, they may be constructed separately, and by utilizing the first spring, the rear end of the first valve element may be maintained in abutment against the second valve element while maintaining a hermetic seal therebetween. In this manner, the assembly is facilitated than when utilizing a staking operation or a press fit to connect them together when they are constructed separately.

Above and other objects, features and advantages of the invention will become apparent from the following description of an embodiment thereof with reference to the attached drawing.

DETAILED DESCRIPTION OF EMBODIMENT

Figure 1:
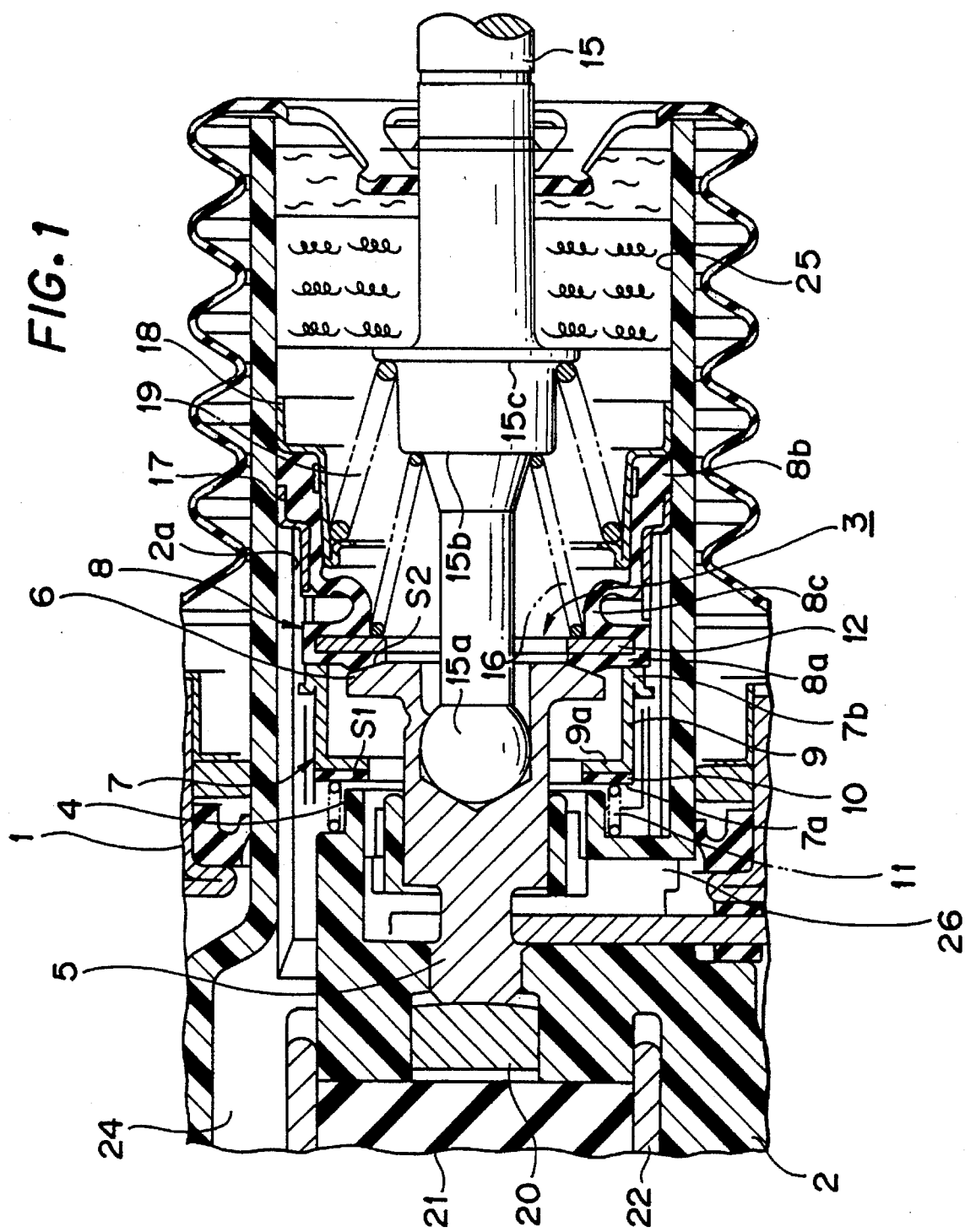
FIG. 1 is an enlarged section of an essential part of one embodiment of the invention.

Referring to FIG. 1, a brake booster includes a shell 1 in which a substantially tubular valve body 2 is slidably disposed. While not shown, a power piston is mounted on the valve body 2, and a constant pressure chamber is defined to the front side or to the left thereof while a variable pressure chamber is defined to the rear side thereof or to the right side. A valve mechanism 3 which switches a flow path is received within the valve body 2.

The valve mechanism 3 comprises an annular, first valve seat 4 formed around the inner peripheral surface of the valve body 2, an annular, second valve seat 6 formed on the rear side of a valve plunger 5 which is slidably fitted into the valve body 2. A front end 7a of a first valve element 7 is adapted to be seated upon the first valve seat 4, and a front end 8a of a second valve element 8 is adapted to be seated upon the second valve seat 6. A rear end 7b of the first valve element 7 is disposed in abutment against a front end 8a of the second valve element 8 at a location radially outward of a second seat area S2 where a contact between the second valve element 8 and the second valve seat 6 occurs.

The first valve element 7 includes a tubular member 9 which is formed of a metal and which is slidably fitted into the valve body 2. The front end of the tubular member 9 is folded radially inward to define a flat 9a, on which an elastic piece 10 is mounted, which serves as the front end 7a to be seated upon the first valve seat 4. The diameter of a first seat area S1 where a contact between the front end 7a of the first valve element 7 and the first valve seat 4 occurs is chosen to be substantially equal to the diameter of the second seat area S2.

A rear portion of the tubular member 9 is folded radially outward, with its tip serving as the rear end 7b. A first spring 11 is disposed between the front end 7a of the first valve element 7 and the valve body 2 to urge the first valve element 7 rearward, thereby maintaining the rear end 7b in abutment against the front end 8a of the second valve element 8 while maintaining a hermetic seal therebetween.

On the other hand, the second valve element 8 comprises a tubular elastic member, and includes a rear end 8b of an increased thickness secured to the inner peripheral surface of the valve body 2 while maintaining a hermetic seal therebetween, a curved portion 8c extending radially inward and axially forward from the rear end 8b, and the front end 8a which extends radially inward from the distal end of the curved portion 8c, with a backup plate 12 formed of a metal embedded in the front end 8a.

The valve plunger 5 is pivotally connected with a spherical tip 15a which is formed at the distal end of an input shaft 15. The input shaft 15 is formed with a first step 15b, and a second spring 16 having a resilience greater than that of the first spring 11 is disposed between the step 15b and the front end 8a of the second valve element 8, thus urging the second valve element 8 and the first valve element 7 forwardly.

A plurality of axially extending ribs 2a is formed in the inner peripheral surface of the valve body 2, the rear end of each rib 2a abutting against a first retainer 17. The rear end 8b of the second valve element 8 is disposed in overlapping relationship with the rear side of the first retainer 17, and a second retainer 18 is disposed in overlapping relationship with the rear side of the rear end 8b. The input shaft 15 is also formed with a second step 15c, and a return spring 19 is disposed between the step 15c and the second retainer 18, whereby the resilience of the return spring 19 is effective to hold the rear end 8b sandwiched and squeezed between the first retainer 17 and the second retainer 18, thus securing the rear end 8b to the valve body 2 while maintaining a hermetic seal and while simultaneously maintaining the input shaft 15 normally in its inoperative position shown.

A terminal end of the input shaft 15 is connected to a brake pedal, not shown, while a plunger plate 20 and a reaction disc 21 are sequentially disposed to the left of the valve plunger 5. The reaction disc 21 is disposed in a recess formed in a push rod 22 connected to a master cylinder, not shown.

A space radially outward of the first seat area S1 where a contact between the first valve seat 4 and the first valve element 7 occurs, or a space radially outward of both the tubular first valve element 7 and the second valve element 8, communicates with the constant pressure chamber through an axial constant pressure passage 24 formed in the valve body 2. A negative pressure from an intake manifold of an engine is normally introduced into the constant pressure chamber.

A space radially inward of the second seat area S2 where a contact between the second valve seat 6 and the second valve element 8 occurs, or a space located radially inward of the second valve element 8, communicates with the atmosphere through an axial pressure passage 25 formed in the valve body 2.

Finally, a space located between the second seat area S2 where a contact between the second valve seat 6 and the second valve element 8 occurs and a region of abutment between the first valve element 7 and the second valve element 8, and which is radially inward of the first seat area S1 where a contact between the first valve seat 4 and the first valve element 7 occurs, or a space radially inward of the first valve element 7, communicates with the variable pressure chamber through a variable pressure passage 26 which is formed to extend radially through the valve body 2.

When the booster is inoperative, the second valve element 8 is seated upon the second valve seat 6 to close the pressure passage 25 while the first valve element 7 is removed from the first valve seat 4 to allow the variable pressure passage 26 to communicate with the constant pressure passage 24, whereby a communication is established between the variable and the constant pressure chamber, into both of which a negative pressure is introduced. At this time, the front end face 8a which is located radially outward of the second seat area S2 is subject to the action of the negative pressure while the rear side is subject to the action of the atmospheric pressure. Accordingly, the resulting pressure differential across the second valve element 8 causes it to be urged forwardly. A combination of the influence of the pressure differential and the resilience of the second spring 16 is large enough to urge the second valve element 8 into seating engagement with the second valve seat 6 and to maintain a hermetic seal therebetween.

If the input shaft 15 is driven forward under this condition, the first valve element 7 and the second valve element 8 are integrally driven forward against the resilience of the first spring 11, the first valve element 7 seating upon the first valve seat 4 to interrupt the communication between the constant pressure passage 24 and the variable pressure passage 26. As the input shaft 15 continues to be driven forward, the second valve element 8 is removed from the second valve seat 6, whereby the pressure passage 25 communicates with the variable pressure passage 26, allowing the atmosphere to be introduced into the variable pressure chamber to operate the booster.

At this time, the front end face 7a of the first valve element 7 located radially outward of the first seat area S1 is subject to the action of the negative pressure in the constant pressure passage 24 while the rear side of the valve element is subject to the action of the atmospheric pressure, so that the resulting pressure differential acts on the first valve element 7 to urge it forwardly. A combination of such pressure differential and the resilience of the second spring 16 is sufficient to cause the first valve element 7 to be seated upon the first valve seat 4.

By contrast, in the prior art arrangement, it has been necessary that the first seat area S1 be disposed radially outward of the second seat area S2, which resulted in a reduced responsive area to the negative pressure, with consequence that the effect of the pressure differential is also reduced. However, in the present embodiment, the diameter of the first seat area S1 is chosen to be substantially equal to the diameter of the second seat area S2, whereby a sufficient responsive area to the negative pressure can be secured on the first valve element, thereby enabling an increased effect of the pressure differential acting upon the first valve element 7. As a consequence, the load with which the second spring 16 must be compressed can be reduced by an amount corresponding to an increase gained in the pressure differential, thus allowing an input required to initiate the operation of the booster to be reduced.

While the invention has been disclosed above in connection with an embodiment thereof, it should be understood that it is illustrative only and that a number of changes, modifications and substitutions therein will readily occur to one skilled in the art from the above disclosure without departing from the scope and spirit of the invention defined by the appended claims.

What is claimed is:

1. In a booster including a valve body slidably disposed within a shell, a power piston mounted on the valve body, a constant pressure chamber and a variable pressure chamber formed across the power piston, a valve mechanism including a valve plunger slidably fitted into the valve body, a constant pressure passage communicating the valve mechanism with the constant pressure chamber, a variable pressure passage communicating the valve mechanism with the variable pressure chamber, and a pressure passage supplying a pressure fluid to the valve mechanism, with the valve plunger, which constitutes the valve mechanism, being actuated to switch a flow path within the valve mechanism to supply the pressure fluid to the variable pressure chamber to move the power piston forward;

a valve mechanism comprising an annular, first valve seat formed on the valve body, a tubular first valve element slidably fitted into the valve body and having a front end which is adapted to be seated upon the first valve seat, an annular, second valve seat formed on the rear side of the valve plunger, a tubular second valve element having a rear end which is hermetically secured to an inner peripheral surface of the valve body and a front end which is adapted to be seated upon the second valve seat, a first spring for urging the first valve element rearward and for maintaining the rear end of the first valve element in abutment against the second valve element hermetically at a location radially outward of a seating engagement between the second valve element and the second valve seat, and a second spring for urging the front end of the second valve element toward the second valve seat and having a resilience greater than the resilience of the first spring, and wherein the constant pressure passage communicates with a space radially outward of the first valve element, the variable pressure passage communicates with a space located radially inward of the first valve element, and the pressure passage communicates with a space radially inward of the second valve element.

2. A valve mechanism for booster according to claim 1 in which a seat defined by the engagement between the first valve element and the first valve seat, and a seat defined by the engagement between the second valve element and the valve seat are of a substantially equal diameter.

3. A valve mechanism for booster according to claim 1 in which the first spring is disposed between the valve body and a front portion of the first valve element, and the second spring is disposed between a front portion of the second valve element and an input shaft which is coupled to the valve plunger.

* * * * *